Dec. 20, 1955 E. W. GOLDBERG 2,727,430
LENS MOUNT FOR PROJECTORS AND THE LIKE
Filed Nov. 7, 1949 2 Sheets-Sheet 1
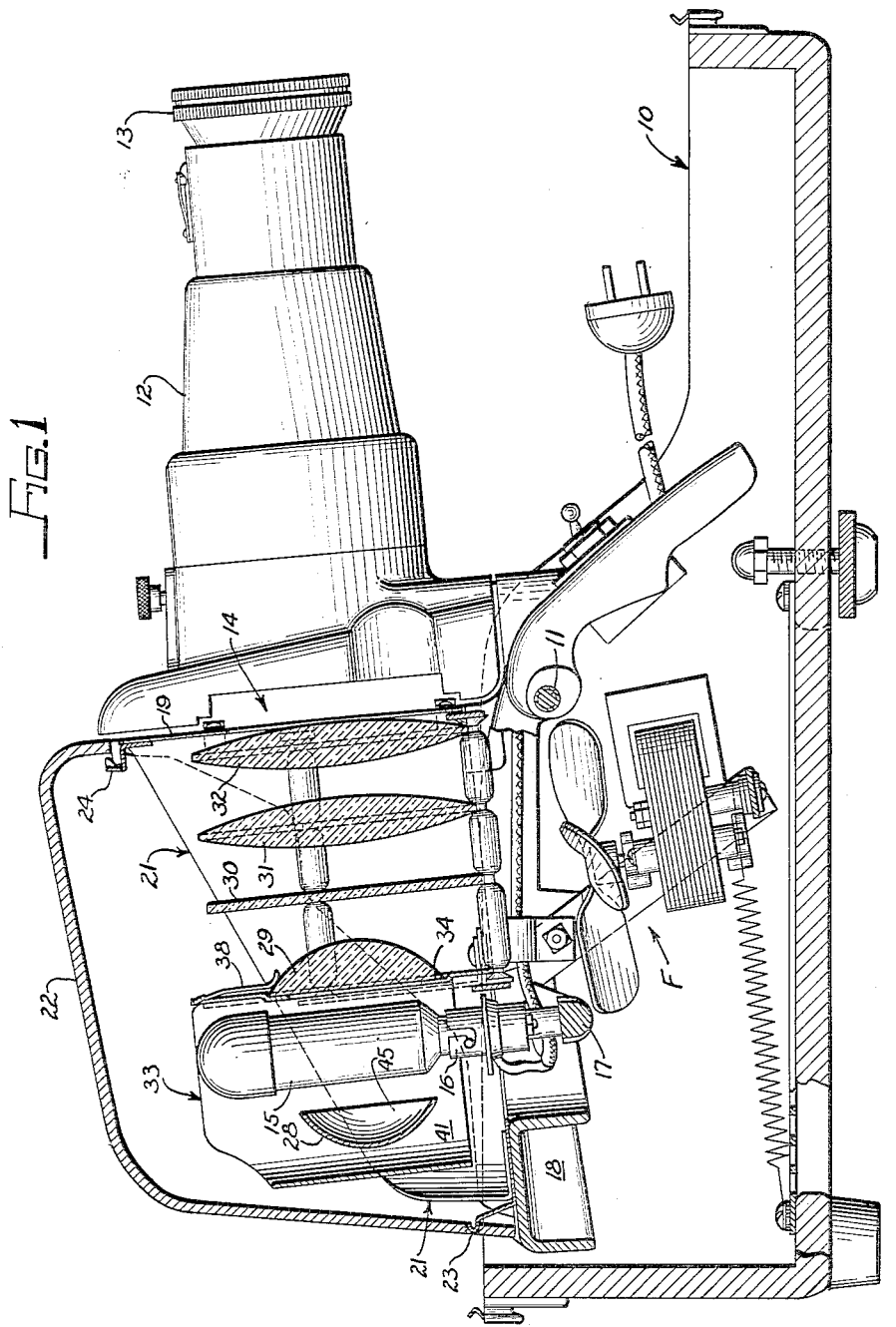
INVENTOR.
Ernest W. Goldberg
BY
Atty.

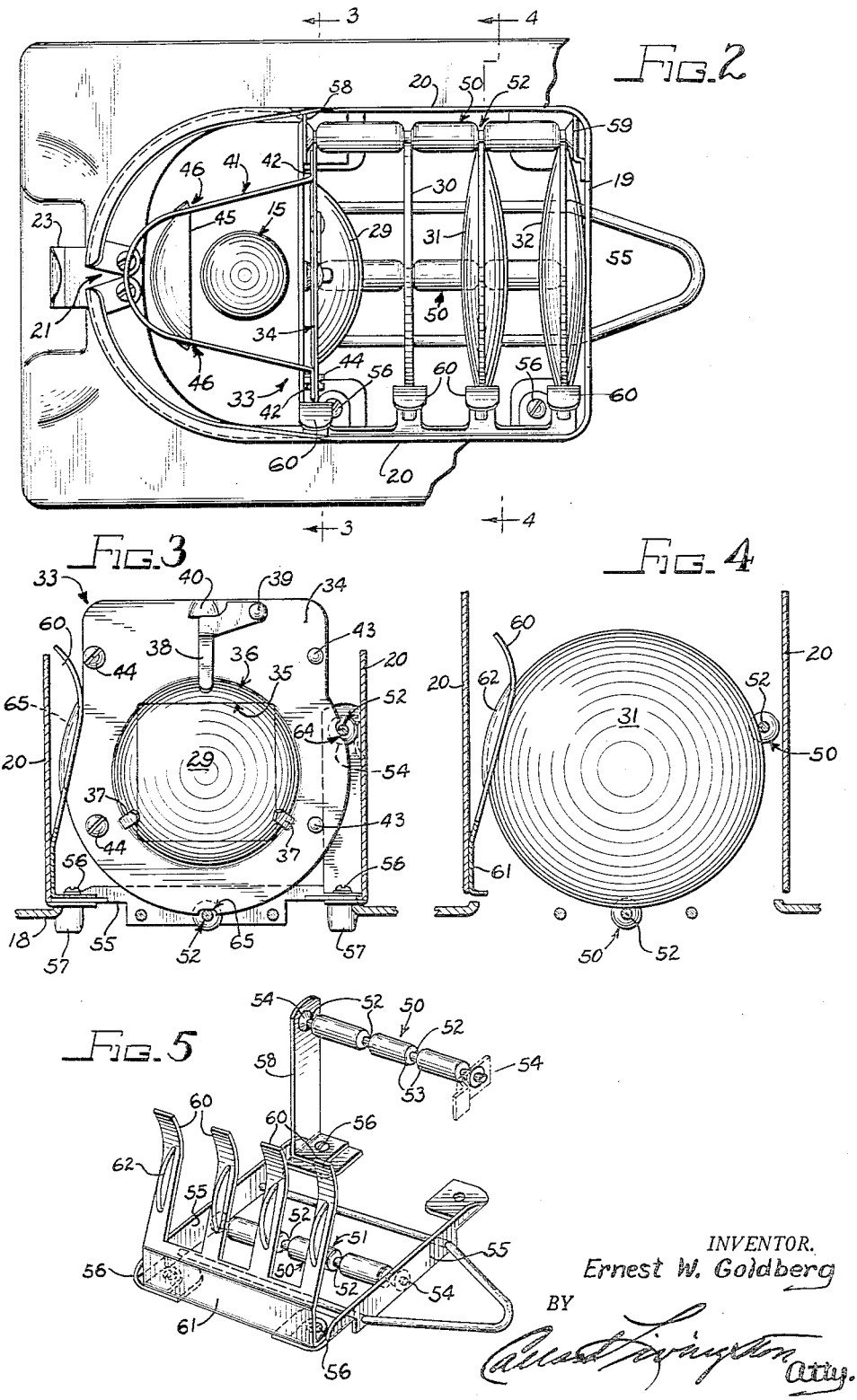

United States Patent Office 2,727,430
Patented Dec. 20, 1955

2,727,430

LENS MOUNT FOR PROJECTORS AND THE LIKE

Ernest W. Goldberg, Wilmette, Ill.

Application November 7, 1949, Serial No. 125,920

17 Claims. (Cl. 88—24)

This invention has as its principal object the provision of improved mounting means for the optical elements of slide projectors and the like, in accordance with which a plurality of lens elements are removably secured in accurate alignment in the projector housing with respect to the light source and the projecting lens system.

Detailed objects reside in the provision of a lens mount consisting of a pair of elongated locator bars, or guides, economically and accurately manufactured by screw-machine processes to afford spaced lens-seating notches or grooves for cooperation with a plurality of juxtaposed spring fingers, each having a curvilinear lens-seating embossment therein, the said fingers and guides being mounted in the projector housing with the lens elements seated therein in a three-point suspension, and the spring finger and an opposite notch portion in one of the guide bars engaging the lens element at a point above the horizontal diameter of the lens seated thereby.

Another object is the provision of a unitary reflector and primary lens assembly, likewise removably seated by the aforesaid mounting means for accurate alignment with the optical axis of the projecting lamp and a plurality of lens elements similarly seated by the aforesaid guide means.

Another object is the provision of a unitary reflector and primary lens assembly for use in the aforesaid mounting means and consisting of a face plate having an embossed lens seat therein, and a lens in the seat held by a pair of integral fingers on the plate, cooperatively with a pivoted spring finger on the plate, together with a U-shaped shield secured at its free edges to the lens plate and having a reflector seated in opposite slots in the bight of the shield in spaced relation to the primary condensing lens to accommodate a lamp therebetween.

Additional objects relate to details of the construction and operation of the lens-seating and aligning parts of the novel assembly and mounting means, as will appear more particularly from the following description taken in view of the annexed drawing in which:

Fig. 1 is a longitudinal section taken through a projector incorporating the novel lens mount, parts of the projector being shown in elevation;

Fig. 2 is a fragmentary top plan view looking down into the lamp housing upon the lens assembly and mount;

Fig. 3 is a vertical sectional fragment through the lamp housing taken in the direction of lines 3—3 of Fig. 2 and showing the front of the reflector unit in elevation;

Fig. 4 is a vertical sectional fragment through the lamp housing showing the novel mounting means for one of the lens elements as seen in the direction of lines 4—4 of Fig. 2;

Fig. 5 is a perspective fragment of the lens mount removed from the housing.

Referring to Fig. 1, the projector there shown consists of a combination base and case tray 10 in which the base casting 18 of the projector is pivotally seated to tilt about an axis through the pivot 11, responsive to manipulation of certain tilting mechanism not shown, said tilting mechanism, base, and case structure being the subject matter of my co-pending application S. N. 125,919 filed November 7, 1949.

The projector includes the usual lens barrel 12, having a projecting lens system 13 at one end thereof, and a slide carrier seat 14 at the opposite end thereof in alignment with a projecting lamp 15 accurately located in socket 16, secured on a cross-bar 17 of base casting 18.

The lamp housing includes a front wall 19 and a pair of opposite side walls 20 (Fig. 2) curved rearwardly to a meeting edge 21, and surmounted by a removable hood 22 (Fig. 1) yieldably held at the rear of the housing by a spring finger 23 and a catching flange 24 at the top of the forward wall 19.

In the present embodiment, the optical system, of which the lamp 15 is considered a part, includes a rondular reflector 28, a primary condensing lens 29, a heat absorbing baffle or glass 30, and a pair of secondary condensing lenses 31 and 32, all of which (including the filament of the lamp 15) must be accurately aligned with respect to the optical axis through the projecting lens system 13. The lens elements are customarily rondular or circular, but it will be understood that the three-point seating arrangement may be employed with other shapes (i. e. square, etc.) of lens so long as the three-point engagement with edge portions thereof is adjusted accordingly.

The reflector 28 and lens 29 are mounted as a unitary assembly generally indicated at 33 (Fig. 1), which may be removed without unseating the lamp 15, and vice versa, the assembly 33 being designated for convenience as a primary lens unit.

The primary lens unit, as shown partly in Fig. 3, consists of a front or face plate 34 having punched therein a rectangular window 35, surrounded by an embossed recess or lens seat 36. From the lower marginal portions of which are struck up a pair of fingers 37 to position the primary lens 29 in the seat, there being another spring finger 38 pivoted on the plate as at 39 to retain the lens when the finger is turned up against an embossed stop 40 on the plate.

As best shown in Fig. 2, a recurving or U-shaped shield plate 41 has opposite free edges 42 secured to the face plate 34 (as by rivets 43 and screws 44, Fig. 3).

Toward the rear or bight portion of the shield 41 is a reflector 45 having opposite circumferential edge portions seated in punched slots 46, in opposite side walls of the shield 41 (see also Fig. 1).

Means for accurately seating and aligning the aforesaid primary lens unit 33, and the other optical elements such as the absorber 30 and the condensing lenses 31 and 32, includes the construction shown in Fig. 5 and consisting particularly of a pair of seating bars 50 and 51, having machined therein a plurality of lens seating notches 52. For reasons of accuracy, as well as economy, these guides are preferably formed from cylindrical rod stock on a screw machine, the circumferential margins of the several seats 52 being rounded, as indicated at 53, the opposite ends of these guide or seating rods being turned down to provide mounting studs 54.

A lower one of the seating bars 51 has its end studs 54 seated in a pair of cross-bars 55, mounted as at 56 (Figs. 2 and 3) on bosses 57 on the projector base 18, while the companion seating bar (Fig. 5) has one of its end studs 54 seated in a spring leg 58 co-mounted with one of the cross-bars 55, as at 56, the opposite end stud being seated in a small bracket 59 (Fig. 2) fixed on the front wall 19 of the housing.

The mounting means is completed by provision of a plurality of spring presser fingers 60 integral with a cross-bar 61, which is co-mounted as at 56 with one terminus of the cross-bars 55 on the side of the lower bar 51 opposite the upper bar 50, each of said fingers having an embossed curvilinear recess 62 adapted to engage a curved peripheral edge portion of the lens, in the manner depicted in Fig. 4, it being noted that the point of engagement of the recess 62 is substantially above the horizontal diameter through the lens 31, and that the point of engagement of the upper guide rod seat 52 is similarly positioned, so that the spring effect of the holding finger is generally downward, whereby the lens elements are firmly but removably secured in positions of accurate alignment relative to the optical axis of the system.

The primary lens unit is removably seated by the aforesaid mounting means in the same manner as any of the individual lens elements, attention being directed to Fig. 3 in which it will be seen that the face plate 34 of said unit is provided with arcuate upper and lower edges in which are notches 64 and 65, said notches engaging in the seat-bar notches or grooves 52, with a corresponding spring finger 60 engaging a curving edge portion of said face plate as at 65. Thus the primary condensing lens 29 and the reflector 45 are accurately located with respect to the lamp 15 and the other elements of the optical system, and to remove any lens element or said primary unit it is merely necessary to retract the corresponding spring finger 60 and lift the element from its seat.

The novel mounting means affords a simple and inexpensive method for mounting a plurality of lens elements in accurate alignment with each element easily and quickly accessible for withdrawal or insertion for purposes of cleaning, substitution, renewal, and shipping.

The construction of the primary lens unit as a removable part of the optical system aligned by the novel mounting means, is also advantageous in affording initial heat dissipation through the metal face-plate 34 and shield 41 for both the primary condenser lens 29 and the reflector 45, which are closest to the light source.

In addition to the stated advantages, it will appear particularly from Figs. 2 and 5 that the mounting means presents a minimum of impedance to the free circulation of air from the regions beneath the lens assembly and upwardly therepast, so that cooling air (by convection or from the fan F, Fig. 1) may circulate upwardly with minimized hindrance.

The objects and advantages of the invention may be realized by modifications of the commercial embodiment described in detail for purposes of illustration, without departing from the intended and fair scope of the annexed claims.

I claim:

1. In a lens system for projectors and the like, including a light source, a first seating bar arranged on one side of and in parallelism with the optical axis through said light source, a plurality of spring presser fingers arranged in a series extending in parallelism with said axis but on a side of the latter opposite from said first bar, a second bar extending parallel with and below said axis in a region between said series of fingers and the first bar, lens seating formations on each said bar and respectively aligned with one of said fingers, an apertured plate seated before said light source in a pair of said formations in both bars and removably held therein by the corresponding finger, a lens carried by said plate before said aperture, a recurved shield carried by said plate and substantially surrounding said light source, a reflector gripped in slots in opposite sides of said shield in alignment with said light source and lens, and a plurality of lens elements each held in corresponding pairs of seating formations in said bars by a corresponding finger, and means mounting said bars and fingers in optical alignment with the light source as aforesaid.

2. In a mount for lens elements, a pair of seating rods and a cooperating series of presser fingers respectively disposed to extend along three sides of an optical axis, said rods having spaced grooves therein opposite each of said fingers to receive the peripheral edge portion of a lens element removably seated therein by pressing action of the corresponding finger, said fingers and one of the corresponding pair of grooves in the seating rod situated opposite thereto being disposed at a distance above the remaining seating rod to engage the edgewise portions of a lens element of predetermined diameter at a point above the center of the lens element.

3. In a mount for lens elements, a pair of rigid seating rods and a cooperating series of presser fingers respectively disposed to extend along three sides of an optical axis, said rods being of substantially thick cross section and having spaced circumferentially-extensive grooves therein opposite each of said fingers said grooves being narrowed at their bottoms to receive the peripheral edge portion of a lens element removably seated therein by pressing action of the corresponding finger, each of said fingers having a lens-engaging recess curved to interfit with a curvilinear edge portion of a lens element.

4. An optical system for use in projectors and the like and comprising a plurality of spring presser fingers aligned in a series along one side of an optical axis, a first rod mounted on the opposite side of said axis from said fingers, a second rod mounted below said axis and between said fingers and first rod, pairs of corresponding lens-seating formations in said rods, and each said pair located opposite one of said fingers, a primary lens unit including a plate, primary lens means on said plate, a shield carried by said plate and having a reflector optically aligned with and spaced a distance from said lens to accommodate a light source therebetween, said plate being seated in a pair of said seating formations and removably held therein by the corresponding finger, and lens elements each removably secured by one of said fingers in a corresponding pair of said seating formations in optical alignment with said reflector and primary lens means.

5. Means for mounting the elements of an optical system and comprising a plurality of spring fingers arranged seriatim along one side of an optical axis, a seating bar on the opposite side of said axis from said fingers, said bar having a lens seating notch formed therein opposite each one of said fingers, and an elongated lens supporting member beneath said axis between said first bar and said fingers, means for securing said fingers, said bar and said supporting member in assembled relation as aforesaid, lens elements being adapted to rest upon said supporting member with edgewise portions engaged in a corresponding notch of said bar and by a corresponding one of said fingers.

6. Mounting means in accordance with claim 5 and further characterized in that said seating bar and said supporting member are cylindrical rods, and said notches are formed as grooves extending circumferentially thereabout.

7. The structure defined in claim 6 in which said grooves have their circumferential margins formed with a radius affording curved or rounded edgewise margins on opposite sides of each groove.

8. The structure set forth in claim 5 in which said fingers are each provided with a recess having a curvature to engage upon the curved edge portion of a lens.

9. A mount for lenses comprising a pair of rigid circumferentially notched bars and means supporting the same in parallelism with an optical axis in relatively lower and upper positions with the respective notches thereof in alignment in pairs to engage respectively the lower edge and a side edge of a round lens seated therein and aligned with said axis, and spring fingers on the opposite side of the lower bar from the upper bar, each said finger being aligned with a pair of said notches and biased to press against the edge of a lens therein in a direction to urge the lens downwardly onto the lower bar and laterally toward said upper bar.

10. A lens mount in accordance with claim 9 in which said fingers each have a curved recess to receive the curved edge portion of a lens engaged thereby and said recesses and said bars are disposed to receive lens elements of a predetermined diameter and said fingers and said upper bar engage said elements at edgewise points above a horizontal diameter therethrough and above said optical axis.

11. A mounting for support of a plurality of lenses in optical alignment with respect to a rectilinear optical axis through the centers of said lenses, said mounting comprising a cylindrical rod on one side of said axis, a series of lens-edge seating grooves in said rod, a corresponding series of lens presser fingers extending along the opposite side of said axis from said rod with one finger opposite each said groove, and an elongated lens supporting member extended below said axis and parallel thereto for supporting the bottom edge of lens engaged with one of said grooves and the corresponding finger and means mounting said rod, said fingers, and said supporting member in assembled relation as aforesaid.

12. The structure set forth in claim 11 and further characterized in that said fingers are integral with a common joining web, said grooves have opposite circumferentially rounded marginal edges, and said fingers each have a rounded recess for engagement with a rounded edge portion of a lens engaged thereby.

13. A removable type lens and reflector assembly comprising a plate having a light passage therethrough and means thereon mounting a lens element before said passage, a recurved shield having opposite edge portions attached to said plate and a bight portion aligned in spaced relation to said passage, vertical slits in opposite walls of said shield adjacent said bight portion, a reflector gripped between said opposite walls with opposite edge portions respectively seated in said slits, and means including three members supportably engaging said plate at three points displaced about a center of the plate containing the optical center of said lens, one of said members being a spring finger pressing said plate into engagement with the other two members.

14. A removable type lens and reflector assembly comprising a plate having a light passage therethrough and means thereon mounting a lens element before said passage, a recurved shield having opposite edge portions attached to said plate and a bight portion aligned in spaced relation to said passage, vertical slits in opposite walls of said shield adjacent said bight portions, a reflector gripped between said opposite walls with opposite edge portions respectively seated in said slits.

15. In a mount for lens elements, at least two cylindrical rod members and means mounting the same in parallelism at a predetermined distance apart to engage, respectively, with a lowermost edge and a side edge of a lens to seat the latter, said rods having mutually aligned chambered grooves therein dimensioned and positioned to form pairs to accurately receive peripheral edge portions of lens elements of predetermined diametric size and predetermined peripheral edge shape and dimension to align said lens elements optically relative to a predetermined optical axis, and a yieldable presser finger for each said pair of grooves and disposed substantially opposite that one of said rods which engages the side edge of the lens, as aforesaid, and acting to engage an approximately opposite side edge of a lens and urge the same into the corresponding pair of seating grooves in both said rods to releasably hold said lens in alignment as aforesaid.

16. In a mount for lens elements, a pair of elongated seating rods and a linearly extensive set of presser members all mounted in a relatively triangular array to extend along three sides of an optical axis, lens-edge-receiving grooves in said rods mutually aligned to form pairs of lens seating grooves with each said pair aligned with one of said presser members, and the latter situated in angularly spaced relation to said rods so as to urge a seated lens element of predetermined diametric dimension toward both rods and into the corresponding pair of grooves.

17. In a mount for lens elements, rigid, elongated, cylindrical rod members and means mounting the same in lower and upper positions to extend in parallelism with an optical axis, the lowermost of said rod members being disposed vertically beneath said axis, and the uppermost of said rod members being disposed at one side of said axis at a level substantially above the lowermost of said rod members and above the optical axis, said upper and lowermost rod members including mutually aligned pairs of circumferentially extensive lens-seating grooves respectively to receive the lower and side edge portions of a lens, and means providing a spring presser finger for each said pair of grooves and disposed on the opposite side of said axis from said upper rod and in a position to engage an edge of a lens seated in the appertaining pair of grooves to press said lens toward both upper and lower rod members and into said appertaining pair of grooves, said presser fingers being yieldable to permit withdrawal of lens from seated position as aforesaid.

References Cited in the file of this patent

UNITED STATES PATENTS

| | | |
|---|---|---|
| 859,215 | Guilbert | July 9, 1907 |
| 930,210 | Mills | Aug. 3, 1909 |
| 1,282,293 | Roebuck | Oct. 22, 1918 |
| 2,169,010 | Teague et al. | Aug. 8, 1939 |
| 2,221,920 | Kurtz et al. | Nov. 19, 1940 |
| 2,231,743 | Young et al. | Feb. 11, 1941 |
| 2,292,966 | Osterberg et al. | Aug. 11, 1942 |
| 2,477,107 | Wolfe | July 26, 1949 |

FOREIGN PATENTS

| | | |
|---|---|---|
| 479,446 | Germany | July 16, 1929 |